US010561977B2

(12) United States Patent
Johannessen et al.

(10) Patent No.: US 10,561,977 B2
(45) Date of Patent: Feb. 18, 2020

(54) METHOD AND APPARATUS FOR DEHYDRATION OF A HYDROCARBON GAS

(71) Applicant: EQUINOR ENERGY AS, Stavanger (NO)

(72) Inventors: Eivind Johannessen, Trondheim (NO); Knut Arid Maråk, Trondheim (NO); Gry Pedersen Kojen, Porsgunn (NO); Arne Olav Fredheim, Trondheim (NO)

(73) Assignee: EQUINOR ENERGY AS, Stavanger (NO)

( * ) Notice: Subject to any disclaimer, the term of this patent is extended or adjusted under 35 U.S.C. 154(b) by 0 days.

(21) Appl. No.: 15/576,450

(22) PCT Filed: Jun. 5, 2015

(86) PCT No.: PCT/EP2015/062593
§ 371 (c)(1),
(2) Date: Nov. 22, 2017

(87) PCT Pub. No.: WO2016/192813
PCT Pub. Date: Dec. 8, 2016

(65) Prior Publication Data
US 2018/0154304 A1    Jun. 7, 2018

(51) Int. Cl.
*B01D 53/00*  (2006.01)
*B01D 53/14*  (2006.01)
(Continued)

(52) U.S. Cl.
CPC ..... *B01D 53/1425* (2013.01); *B01D 53/1493* (2013.01); *B01D 53/263* (2013.01);
(Continued)

(58) Field of Classification Search
CPC .... B01D 2252/2021; B01D 2252/2023; B01D 2256/24; B01D 2257/80; B01D 53/1425;
(Continued)

(56) References Cited

U.S. PATENT DOCUMENTS 3,867,112 A    2/1975   Honerkamp et al.
5,868,005 A    2/1999   Larue et al.
(Continued)

FOREIGN PATENT DOCUMENTS

RU    2199375 C1    2/2003
WO    2010084323 A2    7/2010
(Continued)

OTHER PUBLICATIONS

International Search Report in PCT/EP2015/062593, dated Sep. 17, 2015.
(Continued)

*Primary Examiner* — Sharon Pregler
(74) *Attorney, Agent, or Firm* — Evershed Sutherland (US) LLP

(57) ABSTRACT

A method of dehydrating a hydrocarbon gas stream including stripping water from a liquid desiccant stream using a water-undersaturated portion of the gas stream, drying the gas stream to extract the stripped water, and then further drying the partially-dried gas stream using the stripped desiccant to achieve a low water content level in the gas stream for pipeline transportation. In one embodiment, the liquid desiccant is supplied by a regeneration facility at a remote location and the liquid desiccant is returned to the regeneration facility for regeneration after drying the gas. In another embodiment, the regeneration of the desiccant is performed locally whereby the liquid desiccant is, after drying the gas, stripped again of water and reused locally.

20 Claims, 4 Drawing Sheets

(51) Int. Cl.
*B01D 53/26* (2006.01)
*C10L 3/10* (2006.01)
*E21B 43/36* (2006.01)

(52) U.S. Cl.
CPC .............. *C10L 3/106* (2013.01); *E21B 43/36* (2013.01); *B01D 2252/2023* (2013.01); *C10L 2290/06* (2013.01); *C10L 2290/08* (2013.01); *C10L 2290/12* (2013.01); *C10L 2290/24* (2013.01); *C10L 2290/545* (2013.01); *C10L 2290/58* (2013.01)

(58) Field of Classification Search
CPC .............. B01D 53/1493; B01D 53/263; C10G 70/048; C10L 2290/06; C10L 2290/08; C10L 2290/12; C10L 2290/24; C10L 2290/545; C10L 2290/58; C10L 3/106
See application file for complete search history.

(56) References Cited

U.S. PATENT DOCUMENTS

| | | |
|---|---|---|
| 2007/0084341 A1 | 4/2007 | Heath et al. |
| 2014/0174903 A1* | 6/2014 | Edwards ............ B01D 19/0005 203/18 |
| 2014/0331862 A1 | 11/2014 | Cullinane et al. |

FOREIGN PATENT DOCUMENTS

| | | |
|---|---|---|
| WO | 2013004275 A1 | 1/2013 |
| WO | 2013041143 A1 | 3/2013 |
| WO | 2013124336 A2 | 8/2013 |
| WO | 2014079515 A1 | 5/2014 |
| WO | 2015018945 A2 | 2/2015 |

OTHER PUBLICATIONS

Written Opinion in PCT/EP2015/062593, dated Sep. 17, 2015.
GB Search Report in GB1609717.2, dated Nov. 14, 2016.

* cited by examiner

METHOD AND APPARATUS FOR DEHYDRATION OF A HYDROCARBON GAS

TECHNICAL FIELD

The present invention relates to the dehydration of a hydrocarbon gas stream, in particular using a liquid desiccant such as a dry glycol.

BACKGROUND OF THE INVENTION

Production streams produced by remote or marginal offshore oil and gas fields, in addition to hydrocarbons, often contain liquid water and water in the gas phase. The produced hydrocarbon-containing fluid is warm when leaving the wellhead, generally in the range of 60-130° C. and, if the fluid is transported untreated over long distances and allowed to cool below the hydrate formation temperature, then hydrates will form. Hydrates are sometimes also referred to as clathrate hydrates, gas clathrates, gas hydrates, or clathrates.

Hydrates are ice-like crystalline solids composed of water and gas. The hydrate formation temperature of a typically production stream is in the range of 20-30° C. for pressures of between 100-400 bar(a). Hydrate deposition on the inside wall of gas and oil pipelines is particularly problematic in offshore production infrastructure because, when a warm hydrocarbon fluid containing water flows through a subsea pipeline with cold walls, hydrates will precipitate and adhere to the inner walls. This will reduce the pipeline cross-sectional area, which, without proper counter measures, will lead to a loss of pressure and ultimately to a complete blockage of the pipeline or other process equipment. Subsea transportation of hydrocarbons over any significant distance therefore requires hydrate control.

There are various techniques used for short distance transportation, for example from the wellhead to an offshore processing hub. However, hydrate control for long distance transportation, such as back to land, is typically achieved by use of a hydrate inhibitor mixed with the produced hydrocarbon fluid and/or by removing water from the produced hydrocarbon fluid.

Multi-phase hydrocarbon fluids are often separated for transportation over long distances to avoid problems such as slugging. The present invention relates to the dehydration of a produced hydrocarbon gas phase stream.

The most common prior art method for achieving gas dehydration is by the aid of absorption, wherein water is absorbed by an absorbent or desiccant. The absorbent may be, for example, a glycol (e.g. monoethylene glycol, MEG, or triethylene glycol, TEG) or an alcohol (e.g. methanol or ethanol). These absorbents typically need a low water content level for use in absorption, and so a regeneration unit is required in order to remove water from the glycol or other absorbent to the levels required.

FIG. 1 illustrates an example of a prior art, topside or onshore gas dehydration process using absorption. In this process, wet natural gas 102 is introduced into the bottom of an absorber column 104, and cool, lean glycol 106 is sprayed into the top of the column 104. Water is absorbed from the natural gas as the glycol flows downwards and the gas upwards in the column 104. The dry natural gas 118 exits from the top of the column 104 and the used glycol 110, referred to as "rich glycol", exits from the bottom of the column 104.

Water originating from the wet natural gas 102, now absorbed in the rich glycol 110, is then desorbed from the glycol in a separate process known as glycol regeneration. In the embodiment shown, this process is performed by distillation in a still 112, using low pressure and high temperature to vaporise the water, which is vented from the top of the still 112.

In order to achieve very high purity glycol, a stripping gas 114 having low water content (e.g. a small fraction of the dry natural gas 118) can be injected in the bottom of the still 112 at low pressure and high temperature. This is very efficient for evaporating more water from the regenerated glycol, causing a lower water concentration in the lean glycol than would otherwise be the case.

The now water-desorbed glycol (lean glycol) leaves the still 112 as hot, lean glycol 116, which has a much lower water content than the rich glycol 110. The hot, lean glycol 116 is cooled and is then ready to be mixed with wet natural gas 102 in the absorber column 104 to again absorb water.

The type of glycol conventionally used for topside dehydration processes is TEG (triethyleneglycol). Alternatively, DEG (diethyleneglycol) or MEG (monoethyleneglycol) can be used.

It has been proposed to utilise subsea developments for hydrocarbon processing, rather than surface platforms, in order to reduce costs and topside platform size. For example, WO 2015/018945 broadly proposes a subsea processing facility in which glycol is used subsea to dry a gas-phase hydrocarbon stream to sales gas specifications. In this document, a subsea processing facility is disclosed that includes all of the standard gas processing stages that would otherwise be performed topside to produce a sales gas. The facility particularly includes a subsea glycol scrubber that removes water from the gas stream, and internally provides for full, subsea regeneration of the glycol using gas stripping by a portion of the processed gas (as in FIG. 1). "Make-up" glycol is supplied from topside/onshore, via an umbilical, in order to compensate for losses of glycol to the gas and liquid phases leaving the facility, but the subsea facility is essentially self-contained.

Whilst, in principle, such a facility could be constructed subsea, the number of subsea processing units is traditionally kept low, and the units themselves of reduced complexity, in order to minimise maintenance and reduce the risk of malfunctions.

In order to make gas dehydration processes, such as that illustrated in FIG. 1, more suitable to be used at a subsea installation, it has been proposed that the absorber column 104 be replaced by a system of mixers or contactors, where the natural gas and glycol meet co-currently, and that the relatively complex glycol regeneration process continue to be performed topside or onshore. A subsea dehydration facility incorporating this concept is shown in FIG. 2. Full details of its operation are described in WO 2014/079515.

In this process, a lean glycol stream 191, which is supplied from a topside/onshore glycol regeneration facility, is injected into a natural gas stream 108 and then separated from the gas stream 108 by a scrubber 131. In order to dry the gas stream 108 sufficiently to meet rich gas pipeline transportation specifications, it is a prerequisite that the glycol in stream 191 has been regenerated to a very high concentration, either at a topside facility, or on shore.

MEG is the preferred glycol used in the subsea process illustrated in FIG. 2. This is because the rich MEG exiting in stream 161 (which first has been used to dehydrate the gas stream 108) can act as a hydrate inhibitor when mixed with the water-rich liquid phase hydrocarbon stream 133, ensuring that no hydrates occur in the liquid phase stream on its way to a processing facility. However, most existing MEG-regeneration facilities only regenerate MEG to a purity of around 90 wt %, whereas for sufficient dehydration of the gas stream 108 to meet rich gas pipeline specifications, the purity of the lean MEG must be considerably higher than 90 wt %, and ideally about 98 wt %. Regeneration of MEG to these purities is possible, but requires additional processing after conventional MEG regeneration, such as the gas stripping described above in reference to FIG. 1. This consumes valuable topside platform space and increases the costs for implementing the system in an offshore location due to the additional topside modifications required.

TEG is an alternative glycol that can be used in this system. Existing TEG regeneration units can easily regenerate TEG to a purity of around 99.5 wt %, which is sufficient purity for use as a desiccant to achieve the required gas dryness. Furthermore, TEG is more commonly used at offshore locations than MEG. However, TEG is highly viscous at low temperature and high concentration, which can lead to distribution problems due to the high pressure drop when pumping high purity, lean TEG to the subsea station.

At least the preferred embodiments of the present invention seek to address these problems.

SUMMARY OF THE INVENTION

In a first aspect, the present invention provides a method of dehydrating a hydrocarbon gas stream, comprising: receiving a liquid desiccant; locally stripping at least a portion of the liquid desiccant of water using a water-undersaturated portion of the gas stream to provide a gas stream containing stripped water, and a stripped desiccant stream, the water-undersaturated portion of the gas stream having an initial water content level; a first drying step in which the gas stream containing stripped water is dried to a first water content level to provide a partially-dried gas stream; and a second drying step in which the partially-dried gas stream is dried, using the stripped desiccant stream, to a second water content level to provide a highly-dried gas stream, the second water content level being lower than both the initial water content level and the first water content level.

In one arrangement, the liquid desiccant is supplied from a desiccant regeneration facility at a remote location. Thus, a liquid desiccant can be supplied from the regeneration facility at one (remote) location to a gas processing facility at another (local) location at a lower purity (i.e. with a higher water content) than would otherwise be required to dry the gas to the desired final water content. A portion of the desiccant is stripped of water locally using a water-undersaturated portion of the gas (which readily absorbs water) to further regenerate at least a portion of the desiccant to a high purity level at the facility. A first drying process is then applied to remove the stripped water from the gas, before the gas is then dried by a second drying process to a final water content level using the high purity, stripped desiccant.

In the present context, the remote location where the desiccant regeneration facility is located is physically separate from the location in which the gas stripping step of the dehydration method is performed. For example, the remote location may be at least 100 m away, preferably at least 1 km away. In one embodiment, the method is performed subsea and the regeneration facility is, for example, at a topside platform or facility. In other embodiments, the method is performed at a satellite facility, such as an unmanned wellhead platform, and the regeneration facility is at a main platform. Many of the considerations that apply to subsea facilities, such as the requirements for minimal maintenance and high reliability, also apply to unmanned wellhead platforms.

When using MEG, the above method facilitates the use of MEG that has been regenerated using conventional processing techniques (e.g. at about 90 wt. % purity) to dry gas to very low water content levels, such as below 30 ppm (molar). Thus, additional processing equipment is not required at, for example, a topside platform to achieve such water content levels. Furthermore there is no requirement for a portion of the dried gas to be pumped to the main platform, for example to be used for stripping the MEG during regeneration. Thus, in one embodiment, the entire gas drying process may be performed subsea without need for the gas stream to be directed to the surface between production from the wellhead and transmission to a pipeline.

When using TEG, this process facilitates TEG to be pumped to the facility at lower purities, such as around 95 wt. % TEG. The water content of the TEG mixture (i.e. about 5 wt. % water) significantly reduces its viscosity, thus minimising pressure losses during transport. Furthermore, many TEG processes output "used" TEG having a purity of around 95 wt. %. Thus, by using local stripping, the "used" TEG from other topside processes can be used again in this method as a desiccant before being returned topside for regeneration. This facilitates a reduction in the size of the topside regeneration unit because the size of certain large components of the topside regeneration unit, such as separators, coolers, pumps, pipes, etc., are primarily based on the flow rate of lean TEG required, rather than the quantity of water removed during regeneration.

In another arrangement, the received desiccant supplied to the stripping step for regeneration can be received from the second drying step. Thus, the desiccant is regenerated locally using a simple process, whereby water is stripped into a water-undersaturated portion of the gas, that portion of gas is then partially dried (without the use of the desiccant) to remove the water, and then the partially dried gas is dried to a high level using the stripped desiccant. In this arrangement, the water is stripped from the desiccant into a portion of the gas stream (i.e. the water-undersaturated portion) that still has a relatively high water content level, i.e. the water is being stripped using gas that has not yet been fully processed. For conventional gas stripping, the proportion of gas used for stripping must be kept low to avoid impacting process efficiency due to either the loss of the stripping gas or the need to process the stripping gas again. By using gas before it has been highly processed, a larger proportion of the gas can be used for stripping, which means that the gas can be used at higher pressures and lower temperatures than would be required for conventional processing. This simplifies the processing equipment required and increases operating ranges before problems occur, such as glycol break down. Thus, this process is more reliable and better suited for use in remote locations, such as unmanned satellite facilities or subsea facilities.

Thus, by way of summary, this aspect of the present invention provides a method of dehydrating a hydrocarbon gas stream comprising stripping water from a liquid desiccant stream using a water-undersaturated portion of the gas stream, drying the gas stream to extract the stripped water, and then further drying the partially-dried gas stream using the stripped desiccant to achieve a low water content level in the gas stream for pipeline transportation.

In one embodiment, the liquid desiccant is supplied by a regeneration facility at a remote location and the liquid desiccant is returned to the regeneration facility for regeneration after drying the gas. In another embodiment, the regeneration of the desiccant is performed locally whereby the liquid desiccant is, after drying the gas, stripped again of water and reused locally.

The exact purity of the liquid desiccant required to achieve a desired final water content will vary depending upon the desiccant chosen, the water content in the hydrocarbon gas and the operational conditions of the processing facility. These properties and conditions can, however, easily be measured or controlled, and a liquid desiccant with the appropriate level of water can be selected as required.

In various embodiments, the method may comprise, after the second drying step (optionally after using the liquid desiccant in one or more other process steps locally), returning the liquid desiccant to desiccant regeneration facility at the remote location for regeneration. Thus, in this method, the bulk of the regeneration is performed at the remote location, simplifying the processing required where the dehydration method is performed. Thus, the maintenance levels and risk of failure at this location are reduced. Preferably, the stripping step is the only drying of the desiccant that takes place at the location of the dehydration method, i.e. any other regeneration is performed at the desiccant regeneration unit at the remote location.

Preferably the water-undersaturated portion of the gas stream is provided by a water-undersaturated gas generation step. The undersaturated gas generation step may comprise an initial drying step in which a portion of the gas stream is dried to an initial water content level, and an undersaturating step in which the pre-dried gas stream is heated and/or expanded to generate the water-undersaturated gas.

Where heating is used, the heating is preferably performed using a gas compressor to compress the pre-dried gas stream. Typically, the highly-dried gas must be pressurised, for example for pipeline transportation. Thus, by using a compressor in this step, it is possible to take advantage of waste heat to produce a water-undersaturated gas. The compressor preferably pressurises the gas to a pressure of between 30 and 120 bar(a) in this step. It is alternatively possible to use other forms of heater, such as an electric heater. The pre-dried gas stream may be heated, for example, to temperatures of between 50° C. and 130° C.

Where the pre-dried gas is expanded to undersaturate the gas, the expansion is preferably isothermal expansion or is used in combination with heating. This is because expansion of the gas typically reduces both temperature and pressure. Thus, whilst the water dew temperature decreases as pressure decreases, the reduction in temperature could counteract the decrease in water dew temperature.

The water-undersaturated portion of the gas preferably has an initial water content level at least 100 ppm greater than the second water content level. In various embodiments, the water-undersaturated portion does not comprise any of the highly-dried gas.

Whilst the water-undersaturated portion of the gas stream may comprise the entire gas stream, it is preferably less than the entire gas stream. For example, the water-undersaturated portion of the gas stream may comprise a first portion of the gas stream, such that a second portion of the gas stream that has not been used to strip the liquid desiccant is mixed with the gas stream containing stripped water or with the partially-dried gas stream. Such a configuration minimises unnecessary heating and subsequent cooling of the entire gas stream when only a fraction of the gas is required to strip the desiccant of water. It also reduces the size of the separator required for the stripping step. However, preferably at least 25% of the gas stream is used for stripping because using less gas requires the stripping gas to be either very hot and/or very low pressure, which increases the complexity of the remote system. Thus, in various embodiments, the first portion may comprise between 25% and 100% of the hydrocarbon gas stream, and in one embodiment between 25% and 75% of the hydrocarbon gas stream.

In such an embodiment, the entire gas stream may be subject to the initial drying step, but only the water-undersaturated portion of the gas stream is subject to the undersaturating step to generate water-undersaturated gas. Where compression is used in the undersaturating step, the second, bypass portion of the gas stream that has not been used to strip the liquid desiccant may also be compressed by a compressor used in the undersaturating step, otherwise separate pressuring of the bypass gas may be used to increase its pressure.

The initial drying step preferably comprises cooling the gas stream, optionally in the presence of a liquid desiccant, and separating the mixture into the pre-dried gas stream and a water-containing stream. Where a liquid desiccant is used, the water-containing stream also contains the desiccant. The liquid desiccant in water-containing stream is preferably then regenerated, for example by a topside desiccant regeneration facility.

It is noted here that separators are not ideal and that a small fraction of the liquid phase will be carried over with the gas phase. As such, where reference is made to separated gas, this should be understood to also include any carryover liquid entrained in the gas.

If a liquid desiccant is used and the water content of the liquid desiccant is sufficiently low, then the liquid desiccant absorbs part of the gas phase water remaining in the gas after cooling, further reducing the quantity of water contained in the pre-dried gas stream.

The liquid desiccant preferably also acts as a hydrate inhibitor, which allows the temperature of the cooler to be lower, which knocks out a greater proportion of water. Where a hydrate inhibitor is used, the water-containing stream may also act as a hydrate inhibitor and may be used to inhibit hydrate formation in a liquid hydrocarbon phase, instead of being regenerated.

The first drying step preferably comprises cooling the gas stream containing the stripped water and/or mixing the gas stream containing stripped water with liquid desiccant, followed by separating the mixture into the partially-dried gas stream and a water-containing stream.

In one configuration, the liquid desiccant in the stripping step is a first portion of the liquid desiccant stream received from the remote location and the liquid desiccant in the first drying step is a second portion of the liquid desiccant stream from the remote location.

In various embodiments, the remote location has a desiccant regeneration facility for producing the liquid desiccant stream. Preferably the liquid desiccant stream is transported from the remote location as a single stream.

Where the first drying step comprises mixing the gas stream containing stripped water with liquid desiccant, the water-containing stream contains the liquid desiccant. The water-containing stream may then be provided to the initial drying stage as a hydrate inhibitor and/or desiccant (dependent upon its composition and water content).

Although not be required in all situations, for example where the method is applied to a stream comprising very low quantities of liquid phase hydrocarbons and/or heavy hydrocarbons, the method may comprise an initial separation step in which a multi-phase hydrocarbon stream is separated into the gas phase hydrocarbon stream and a hydrocarbon liquid stream.

The stripping step preferably comprises co-currently mixing the liquid desiccant with the water-undersaturated portion of the gas stream and separating the mixture into the gas stream containing stripped water and the stripped desiccant stream. Similarly, the second drying step preferably comprises co-currently mixing the stripped desiccant with the partially-dried gas stream and separating the mixture into the highly-dried gas stream and a desiccant stream. The use of co-current mixing and separation is structurally simple and thus well suited for use in subsea or other remote locations due to the reduced maintenance requirements and decreased risk of failure.

The desiccant stream from the second drying step will still have a relatively high purity. Thus, preferably the desiccant stream from the second drying step is recycled. For example, the desiccant stream from the second drying step may be mixed with the desiccant stream supplied to the stripping step. In an alternative embodiment, the desiccant stream may be mixed with desiccant supplied to the initial drying step or to the first drying step, where applicable.

The method may further comprise compressing the gas stream to a pipeline transportation pressure, for example at least 100 bar(a). The method may optionally further comprise cooling the gas stream after compression. The compression and cooling may be performed after the second drying step, or may alternatively be performed after the first drying step and before the second drying step. Performing the method before the second drying step ensures that no water is inadvertently condensed by the pressurising and cooling steps after drying to the final water content level.

Where the partially-dried gas is pressurised before the second drying step, the method may also comprise pressurising the stripped desiccant, for example using a pump.

The method may comprise controlling supply of the desiccant to the stripping step so as to regulate the water content level of the highly-dried gas stream.

In another aspect, the present invention also provides a hydrocarbon gas dehydration facility, comprising: a stripping stage configured to receive a desiccant stream and water-undersaturated hydrocarbon gas stream, wherein the stripping stage is configured to strip water from the desiccant using the hydrocarbon gas stream, and to output a gas stream containing the stripped water, and a stripped desiccant stream; a first drying stage configured to receive the gas stream containing the stripped water, the first drying stage being configured to dry the gas stream containing the stripped water to a first water content level, which is output a partially-dried gas stream; and a second drying stage configured to receive the partially-dried natural gas stream and the stripped desiccant stream, the second drying stage being configured to dry, using the stripped desiccant stream, the partially-dried gas stream to a second water content level, which is output a dried gas stream, the second water content level being lower than the first water content level.

In one implementation, the hydrocarbon gas dehydration facility may be configured to output rich desiccant for regeneration by a desiccant regeneration unit at a location remote from the hydrocarbon gas dehydration facility. In one embodiment, the facility preferably does not comprise a desiccant regeneration unit for regenerating rich desiccant (e.g. desiccant at its highest water content within the facility) to a lower water content. That is to say, the desiccant must be sent to an external regeneration unit for regeneration.

In another implementation, the hydrocarbon gas dehydration facility may be configured so as not to output rich desiccant for regeneration by a desiccant regeneration unit at a location remote from the hydrocarbon gas dehydration facility. Thus, a desiccant stream from the second drying stage may be supplied to the stripping stage for regeneration.

The facility preferably further comprises an initial separation stage arranged to receive a multi-phase hydrocarbon fluid and to output the hydrocarbon gas stream and a hydrocarbon liquid stream. The initial separation stage preferably comprises a multi-phase separator.

The facility preferably further comprises an initial drying stage configured to receive the hydrocarbon gas stream, preferably from the initial separation stage, and to dry the hydrocarbon gas stream to an initial water content level, which is output as a pre-dried hydrocarbon gas stream.

The initial drying stage preferably comprises a cooler and a separator. Cooling the gas stream causes water to condense due to the reduction of the temperature below the water dew point of the gas. Thus, water will condense leaving liquid water and saturated gas (with a water dew temperature at the cooled temperature). The temperature is, however, preferably maintained above a hydrate formation temperature to prevent hydrate formation. The condensed water can then be removed using the separator. The cooler may be a gas-water heat exchanger configured to exchange heat with the surrounding water. Alternatively an expander may be used to decrease the temperature, which is not dependent on the surrounding water temperature.

Optionally, the facility may be configured such that a hydrate inhibitor is mixed with the gas stream upstream of the cooler, for example using a co-current mixer. The hydrate inhibitor allows the cooler to reduce the temperature of the water below the uninhibited hydrate formation temperature.

Optionally, the facility may be configured such that liquid desiccant is mixed with the gas stream upstream of the separator (either upstream or downstream of the cooler), for example using a co-current mixer. The desiccant absorbs water from the gas phase after the cooling has knocked out the water.

The liquid desiccant and the hydrate inhibitor may be the same mixture, which may be a liquid desiccant and water mixture output from the first drying stage or from the second drying stage.

The facility preferably further comprises an undersaturation stage configured to receive at least a portion of the hydrocarbon gas stream, preferably from the initial drying stage, and to heat and/or expand the hydrocarbon gas stream to generate a water-undersaturated portion of the gas stream. The facility is preferably configured such that the water-undersaturated portion of the gas stream is then supplied to the stripping stage.

The undersaturation stage preferably comprises a gas compressor, which increases the temperature and the pressure of the gas. However, in other embodiments, the undersaturation stage may comprise another heat generating device, such as an electric heater. In yet further embodiments, the undersaturation stage may comprise an expansion device, which is preferably a substantially isothermal expansion device.

The facility may be configured such that a second portion of the gas stream bypasses the heating stage and the stripping stage and is supplied directly to the first drying stage. Preferably the second portion of the gas stream is supplied from the initial separating stage or the initial drying stage.

The facility may comprise a compression stage, for example including a compressor and cooler, that is configured to pressurise the gas stream, for example to a pipeline transportation pressure. The compression stage may be downstream of the drying cooling stage, or between the first drying stage and the second drying stage. The facility may also comprise a pump or other means for pressurising the stripped desiccant for supply to the second drying stage.

Preferably the facility comprises a liquid desiccant inlet for receiving liquid desiccant, for example from a topside regeneration unit. The liquid desiccant inlet may supply a first portion of the liquid desiccant to the stripping stage to be stripped.

The liquid desiccant preferably has a purity that is not sufficiently high (without further processing) to dry the gas stream to the second water content level. Preferably, however, the liquid desiccant has a purity sufficiently high to dry the gas stream to the first water content level. Thus, in one embodiment, a second portion of the liquid desiccant is supplied to the first drying stage and the first drying stage is configured to dry the gas stream containing the stripped water by mixing with the liquid desiccant.

In an embodiment, the first drying stage may comprise a cooler configured to knock out water contained in the gas stream containing the stripped water. In one embodiment, the first drying stage comprises a cooler and a mixer for mixing the gas stream containing the stripped water with the liquid desiccant.

The first drying stage preferably comprises a separator for separating condensed or absorbed water from the gas stream. The separator may therefore output the partially-dried gas stream and a water-containing stream. Where the first drying stage is configured to dry the gas stream by mixing with the liquid desiccant, the water-containing stream also contains the liquid desiccant.

The water containing-stream from the separator of the first drying stage may be directed to the initial drying stage for use as a hydrate inhibitor and/or as a desiccant. Alternatively, the water-containing stream from the separator may be output from the facility, for example for reinjection into a well.

The stripping stage preferably comprises a co-current mixer for mixing the water-undersaturated portion of the gas with the desiccant stream and a separator downstream of the co-current mixer for separating the gas-desiccant mixture into the gas stream containing the stripped water, and the stripped desiccant stream.

The stripping stage may further comprise a desiccant recovery stage for recovering gaseous desiccant from the gas stream containing stripped water. The desiccant recovery stage preferably comprises a cooler for condensing the gaseous desiccant and a separator for separating condensed desiccant from the gas stream containing stripped water. The recovered desiccant (the condensed desiccant from the separator) is preferably supplied to the stripping stage. The cooler preferably cools the gas stream containing stripped water by at least 20° C., but preferably to a temperature no less than 20° C. higher than a temperature of the partially-dried gas from the first drying stage.

It should be understood that any features of the method or of the facility may be combined with features of the other, insofar as they are compatible.

Viewed from an alternative aspect, the present invention can also be seen to provide a method of dehydrating a hydrocarbon gas stream, comprising: regenerating a liquid desiccant at a first location; supplying the liquid desiccant to a processing facility at a second location remote from the first location; further regenerating the partially-regenerated liquid desiccant at the processing facility using gas stripping; drying the hydrocarbon gas at the processing facility using the further-regenerated liquid desiccant; and returning used liquid desiccant to surface level for regeneration.

In accordance with this aspect, it will be appreciated that the regeneration process has been separated into an initial (relatively complex) regeneration process performed at the first location and a further (relatively simple) regeneration process performed at the remote location. As discussed above, for MEG, this facilitates the regeneration of MEG to high purity without the need for additional topside processing equipment and without the need for a portion of the gas to be directed topside for gas stripping. For TEG, this facilitates low purity TEG, having relatively low viscosity, to be pumped to the subsea facility before being regenerated at the second location for dehydration.

Preferably the second location is subsea, such that the processing facility is a subsea processing facility. In this embodiment, the first location is preferably a topside platform, although it could be elsewhere, such as on shore.

In one embodiment, the method may further comprise using the regenerated liquid desiccant in a process at the first location, and supplying the liquid desiccant to the processing facility at the second location after use in the process at the first location without further regeneration.

The method of further regeneration by gas stripping preferably comprises stripping water from the regenerated desiccant using a water-undersaturated portion of the hydrocarbon gas stream.

In various preferred embodiment, the steps of further regenerating the liquid desiccant at the facility using gas stripping, and drying the hydrocarbon gas at the facility using the further-regenerated liquid desiccant are equivalent to the method of dehydrating a hydrocarbon gas stream discussed above. These steps may optionally include any or all of the preferred features of that method.

Similarly, in various preferred embodiment, the hydrocarbon gas dehydration facility discussed above is equivalent to the processing facility of this method. The facility may therefore optionally include any or all of the preferred features of that facility.

In the preferred embodiments, the hydrocarbon gas stream in the methods and facility described above is the gas phase of a produced natural gas stream.

In various embodiments of the methods and facility described above, the liquid desiccant may comprise a glycol, an alcohol, an amine, or a mixture of two or more thereof. Preferably the stripped desiccant has a purity sufficiently high to dry the partly-dried gas to meet a water content level requirement of a pipeline transportation specification. In one embodiment, the stripped desiccant has a purity sufficiently high to dry the partly-dried gas stream to a water content level of below 50 ppm (molar), and preferably below 35 ppm (molar).

In one preferred embodiment, the liquid desiccant is MEG. Preferably, the MEG has a purity before the stripping step of between 85 wt. % and 95 wt %, and more preferably between 85 wt. % and 92 wt %. The stripped MEG preferably has a purity of greater than 95 wt. %, and more preferably greater than 97%.

In another preferred embodiment, the liquid desiccant is TEG. Preferably, the TEG has a purity before the stripping step of between 90 wt. % and 97 wt %, and preferably between 92 wt. % and 96 wt %. The stripped TEG preferably has a purity of greater than 97 wt. %, and more preferably greater than 98.5%.

In yet another preferred embodiment, the liquid desiccant is MDEA (Methyl Di-ethanol Amine). Preferably, the MDEA has a purity before the stripping step of below 95 wt %. The stripped MDEA preferably has a purity of greater than 97 wt. %, and more preferably greater than 98.5%.

In one embodiment, the liquid desiccant comprises a mixture of MDEA and TEG or MEG.

BRIEF DESCRIPTION OF THE DRAWINGS

Certain preferred embodiments of the present invention will now be described in greater detail by way of example only and with reference to the drawings, in which.

DETAILED DESCRIPTION

Figure 3:
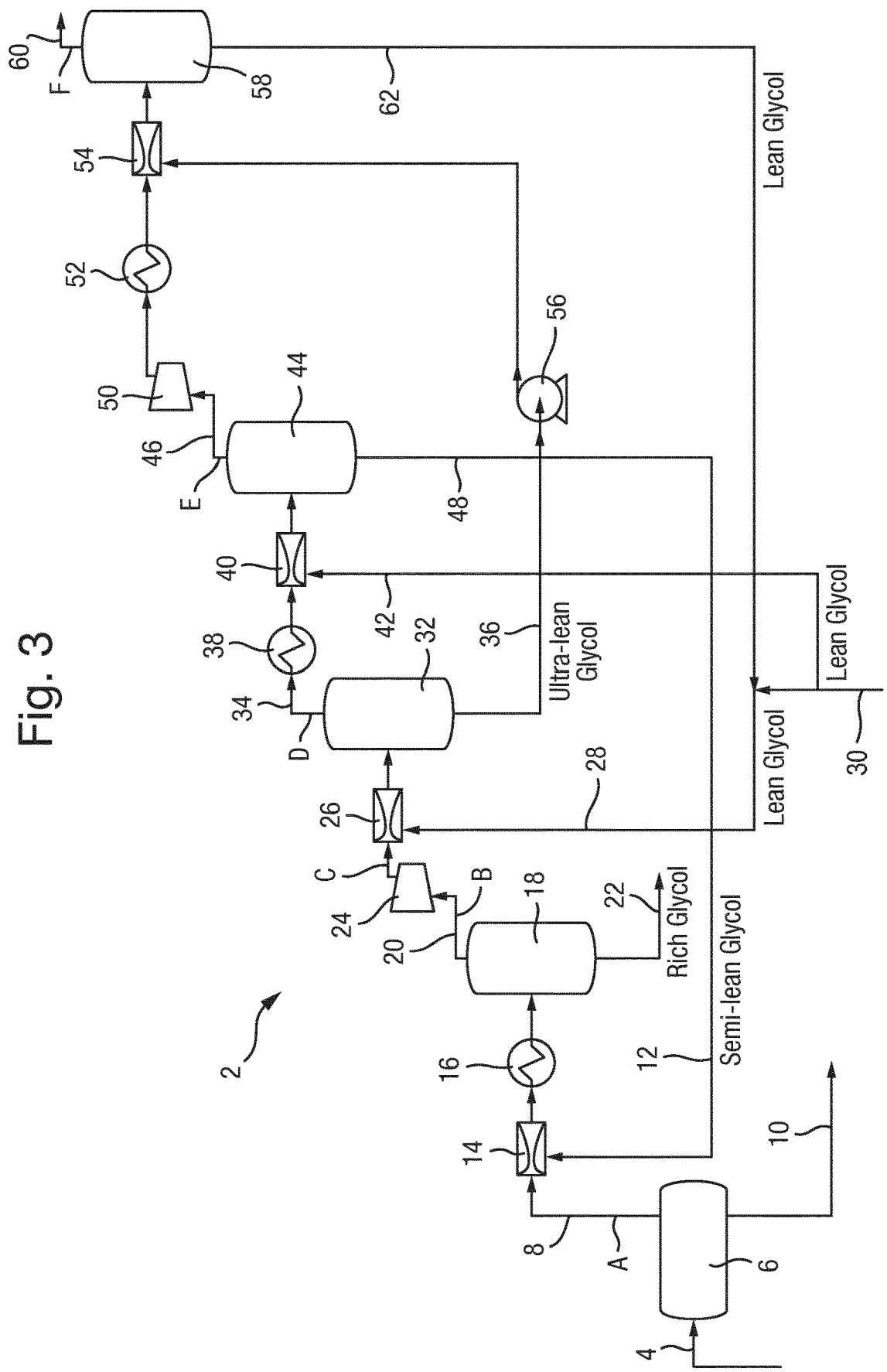
FIG. 3 illustrates a subsea hydrocarbon processing facility according to a first embodiment.

FIG. 3 schematically illustrates a subsea processing facility 2 for processing a multiphase hydrocarbon flow from a wellhead. The facility 2 is arranged to receive a multiphase hydrocarbon flow, separate the hydrocarbon flow into a gas phase and a liquid phase, and process at least the gas phase to a desired specification, for example a pipeline transportation specification. Various techniques for processing the liquid phase are known in the art and can be adopted as appropriate. Details of the liquid phase processing will not be described herein in detail.

In the following description, the terms "lean glycol", "semi-lean glycol", "ultra-lean glycol" and "rich glycol" are used. However, it should be understood that these terms are not intended to have specific meanings, but are used herein to give a general indication of the purity of the glycol at the various stages.

Within the art, the terms "lean glycol" and "rich glycol" are understood to refer, respectively, to glycol before being used for a drying process and after being used for a drying process. However, depending on the particular process, the purity of the lean and rich glycols for that process will vary. For example, the rich glycol from one process may have a higher purity than the lean glycol required for another process.

As used herein, the term "lean glycol" refers to glycol at or about the purity received by the facility 2, the term "ultra-lean glycol" refers to stripped glycol having a purity higher than that of the lean glycol and sufficiently high to dry a hydrocarbon gas stream to a desired facility output specification, the term "rich glycol" refers to the glycol at its highest water content, as output from the facility 2, and the term "semi-lean glycol" refers to a glycol having a purity between the lean glycol purity and the rich glycol purity.

Turning now to FIG. 3, a multi-phase hydrocarbon-containing well stream is received from a wellhead via a pipeline 4. The well stream will typically contain a mixture of liquid phase hydrocarbons, gas phase hydrocarbons and water. The mixture may also contain contaminants, such as sour gases, and depending on the distance from the wellhead, the mixture may also contain a hydrate inhibitor injected to prevent hydrate formation in the pipeline 4.

The well stream is separated into a gas phase and a liquid phase via a first separator 6. The gas phase is output via a first gas-phase conduit 8 and the liquid phase is output via a first liquid-phase conduit 10. The gas phase stream typically comprises hot, saturated hydrocarbon gas, typically at temperatures of between 60-130° C.

The gas phase stream in the first gas-phase conduit 8 is then mixed with a semi-lean glycol mixture using a first mixer 14. The semi-lean glycol mixture is supplied to the first mixer 14 via a semi-lean glycol conduit 12. In this embodiment, the semi-lean glycol functions primarily as a hydrate inhibitor such that the hydrate formation temperature of the gas phase stream in the first gas-phase conduit 8 is reduced. Depending on the purity of the semi-lean glycol mixture, it may also act partially as a desiccant.

The gas phase stream is then cooled using a first cooler 16 to knock out vaporised water. Because glycol is injected by the first mixer 14, the temperature of the stream leaving the first cooler 16 may be above or below the hydrate formation temperature of the uninhibited gas stream. However, the temperature of the stream leaving the first cooler 16 should still be above the hydrate formation temperature of the hydrate-inhibited gas in order to prevent hydrate formation in the conduit 8 or a downstream separator 18. The first cooler 16 comprises a gas-water cooler that heat exchanges with the surrounding sea water. The glycol content in the stream will most likely be high enough to cool the gas to about seabed temperature, if the size of the first cooler 16 allows.

The cooled stream is then passed from the cooler 16 to a second separator 18 where gas and liquid phases are separated into a gas phase exiting the separator 18 via a second gas-phase conduit 20 and a liquid phase exiting the separator 18 via a second liquid-phase conduit 22.

The liquid phase exiting the second separator 18 is a rich glycol mixture comprising glycol, water and possibly a small quantity of condensed heavy hydrocarbons. The rich glycol mixture in the second liquid-phase conduit 22 may be returned to a topside plant for regeneration or may be injected into a liquid phase hydrocarbon flow to act as a hydrate inhibitor for that flow.

The gas phase exiting the second separator 18 via the second gas-phase conduit 20 is a cool, saturated gas-phase hydrocarbon stream. The gas phase in the second gas-phase conduit 20 is then heated to create a water-undersaturated hydrocarbon gas stream. A water-undersaturated gas is one having a temperature higher than its water dew temperature at the appropriate pressure. This means that the water-undersaturated stream has capacity to hold additional gas-phase water at its current temperature and pressure. In this embodiment, the gas phase stream is both heated and pressurised using a compressor 24, but the increase in temperature is sufficient to overcome the increase in water dew temperature due to the increased pressure. The water-undersaturated hydrocarbon gas stream will typically have a temperature between 50° C. and 130° C. Where a compressor is used, the temperature increase is proportional to the pressure increase. To achieve this temperature, the compressor might pressurise the gas to a pressure of between 30 and 120 bar(a), although the efficiency of the compressor may be adjusted to achieve the desired temperature and pressure.

The water-undersaturated hydrocarbon gas stream in the second gas-phase conduit 20 is then mixed with a lean glycol mixture using a second mixer 26. The lean glycol mixture is supplied to the second mixer 26 via a first lean glycol conduit 28. The first lean glycol conduit 28 receives a first portion of a lean glycol mixture supplied to the facility 2 via a lean glycol supply conduit 30.

The water-undersaturated hydrocarbon gas stream has a high affinity for water and therefore draws water from the lean glycol mixture. This process is known as "stripping".

The high temperature of this mixture also causes water to evaporate from the lean glycol, further decreasing the water content in the glycol.

The mixture is then passed from the second mixer 26 to a third separator 32 where gas and liquid phases are separated into a gas phase exiting the separator 32 via a third gas-phase conduit 34 and a liquid phase exiting the separator 32 via a third liquid-phase conduit 36.

The liquid phase in the third liquid-phase conduit 36 comprises an ultra-lean glycol mixture that has a lower water content than the lean glycol supplied by the first lean glycol conduit 28. The third liquid-phase conduit 36 may therefore also be considered to be an ultra-lean glycol conduit 36. By selecting suitable parameters for the flow rate of lean glycol and hydrocarbon gas and for the operation of the compressor 24, it is possible to regulate the water content of the ultra-lean glycol such that it is sufficiently low to dry a gas to a desired specification, such as a pipeline transportation specification as discussed in WO 2014/079515.

The gas phase from the third separator 32 in the third gas-phase conduit 34 comprises a higher water content than the gas phase in the second gas-phase conduit 20 from the second separator 18 because water has been stripped from the glycol by the hydrocarbon gas.

The gas phase in the third gas-phase conduit 34 is cooled by a second cooler 38 and the cooled gas phase stream is then mixed with a lean glycol mixture by a third mixer 40. The lean glycol mixture is supplied to the third mixer 40 via a second lean glycol conduit 42. The second lean glycol conduit 42 receives a second portion of a lean glycol mixture supplied to the facility 2 via the lean glycol supply conduit 30.

Cooling the gas stream using the second cooler 38 knocks out most of the water stripped from the lean glycol mixture injected by the second mixer 26. The lean glycol injected by the third mixer 40 also acts as a desiccant to draw further water out of the gas phase.

The mixture is then passed from the third mixer 40 to a fourth separator 44 where gas and liquid phases are separated into a gas phase exiting the separator 44 via a fourth gas-phase conduit 46 and a liquid phase exiting the separator 44 via a fourth liquid-phase conduit 48.

The liquid phase exiting the fourth separator 48 in the fourth liquid phase conduit 48 is a semi-lean glycol mixture comprising glycol and water, where the purity of the semi-lean glycol is less than the purity of the lean glycol. In this embodiment, the fourth liquid phase conduit 48 connects to the semi-lean glycol conduit 12 such that the semi-lean glycol from the fourth separator 44 is supplied to the first mixer 14.

The gas phase in the fourth gas-phase conduit 46 is pressurised by a compressor 50 to a pressure for pipeline transportation, such as about 150 bar(a).

The pressurised gas stream is then cooled by a third cooler 52 to counteract heating caused by the compressor 50.

The gas phase in the fourth gas-phase conduit 46 is then mixed with the ultra-lean glycol mixture by a fourth mixer 54. The ultra-lean glycol mixture is supplied to the fourth mixer 54 via the ultra-lean glycol conduit 36 from the third separator 32. A pump 56 is incorporated in the ultra-lean glycol line 36 to pressurise the supply of ultra-lean glycol to the fourth mixer 54 for mixing with the pressurised gas phase stream.

The mixture is then passed from the fourth mixer 54 to a fifth separator 58 where gas and liquid phases are separated into a gas phase exiting the separator 58 via a fifth gas-phase conduit 60 and a liquid phase exiting the separator 58 via a fifth liquid-phase conduit 62.

Relatively little water remains in the gas phase in the fourth gas-phase conduit 46. Thus, the glycol from the separator 58 that exits in the fifth liquid phase conduit 62 is still relatively lean. The glycol in this conduit 62 can therefore be recycled into one of the first or second lean glycol conduits 28, 42 to improve efficiency (recycling into the first lean glycol conduits 28 is shown in FIG. 3).

The gas phase exiting the fifth separator 58 via the fifth gas phase conduit 60 has been dried so as to have a water content sufficiently low such that hydrates do not form during transportation at ambient seabed temperatures. Typically this is a water content level in the range of 30 to 80 ppm (molar).

After being used in the facility 2, the rich glycol from the facility 2 is returned to a topside platform or shore for regeneration by a glycol regeneration unit (not shown). In this embodiment, the rich glycol is contained in liquid phase conduit 22. The glycol regeneration unit, either topside or onshore, will most likely be an existing facility which is processing another hydrocarbon feed stream from the same or another reservoir as the subsea gas treating facility 2. Therefore, there may be hydrocarbon gas available at the location of the regeneration unit (from another source) that can be used for stripping of the glycol to a low water content.

When rich TEG from an existing topside facility is used in the subsea gas treating facility, it is likely that the topside regeneration unit will have stripping gas. Most TEG regeneration units use gas stripping. When MEG is used in the subsea gas treating facility, although, in principle, it is possible to design MEG regeneration units with stripping gas, it is not common for MEG regeneration units to use gas stripping.

On the other hand, if the glycol is regenerated at a utility ship or similar facility which does not process another hydrocarbon feed stream, then the glycol regeneration will most likely be done without stripping gas at that location.

Figure 1:
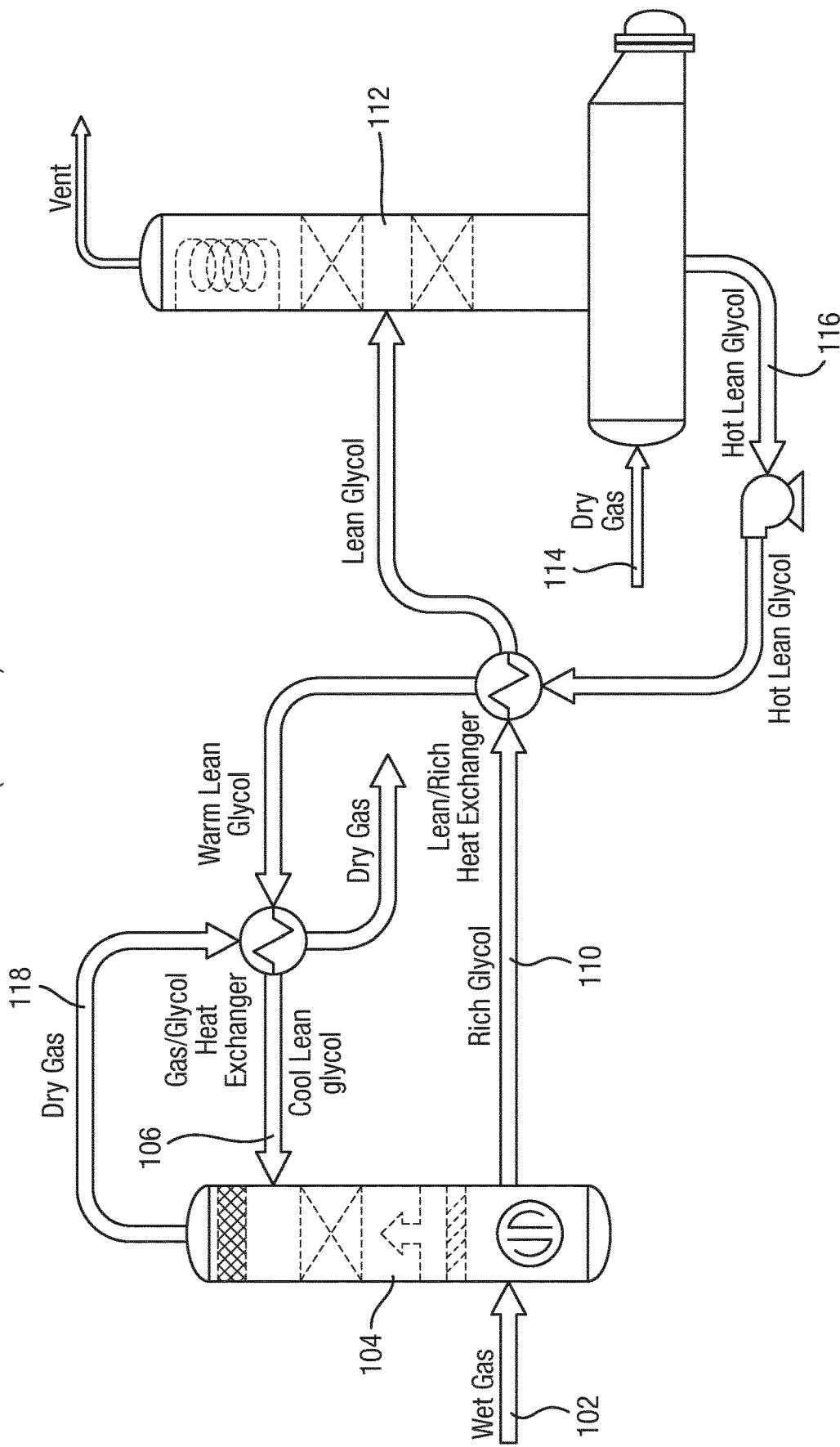
FIG. 1 illustrates a prior art topside gas drying facility.
Figure 2:
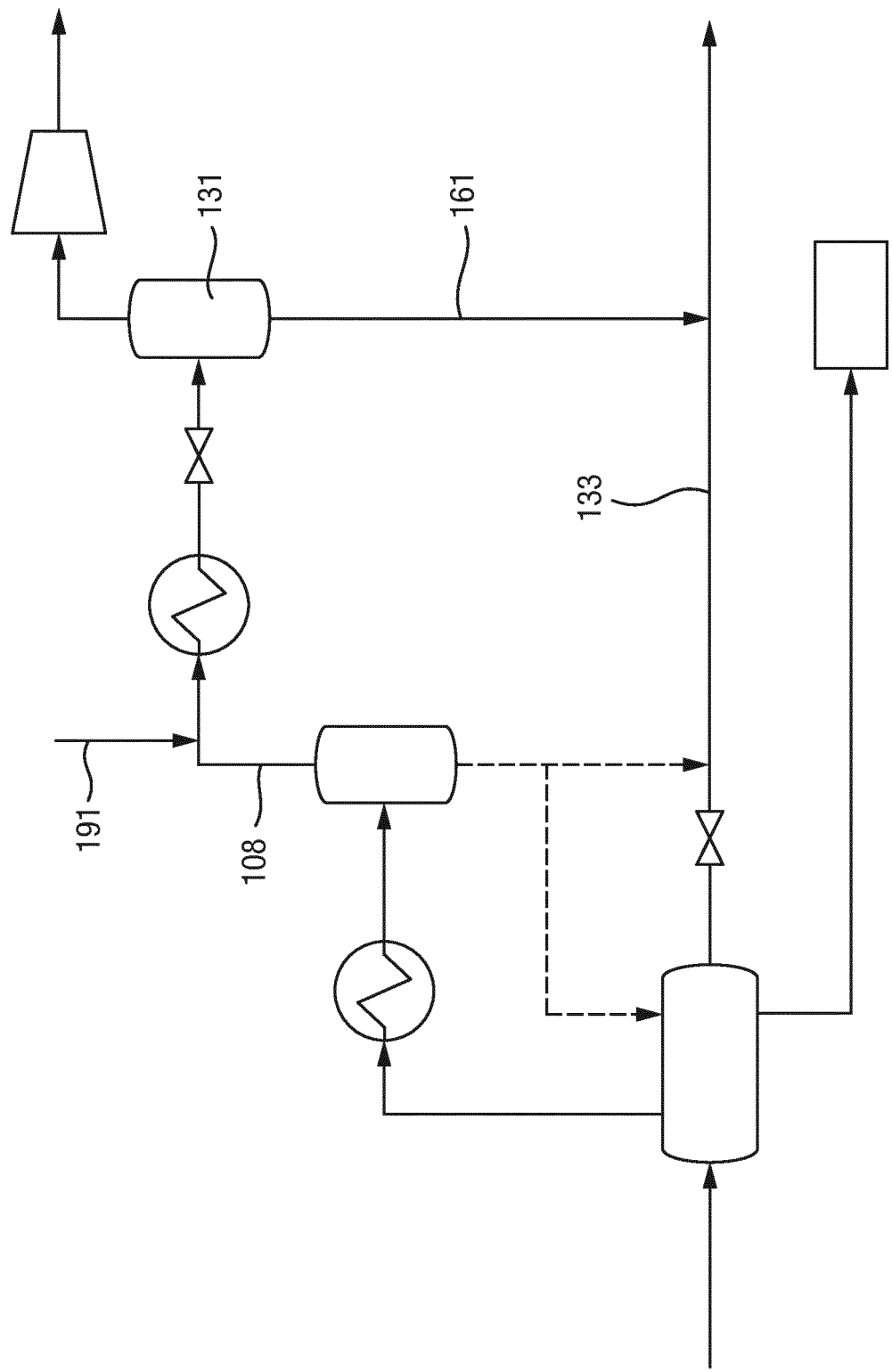
FIG. 2 illustrates a prior art subsea gas drying facility.

In this embodiment, the rich glycol is regenerated by a regeneration process substantially the same as illustrated in FIG. 1, except that no gas stripping is used. That is to say, the rich glycol 110 supplied to a still 112, where high temperature and low pressure is used to vaporise the absorbed water, and the resulting lean glycol 106 is then supplied back to the facility 2.

In one embodiment, the lean glycol 106 is first used in a topside process before being supplied to the facility 2. No further regeneration is performed between this process and the glycol being supplied to the facility.

The following data relate to a first specific example illustrating the steady state operational conditions of the facility 2 when using MEG as the glycol. The process gas received by the facility 2 in this example is a water-saturated, lean gas, comprising low levels of $C_{2+}$ hydrocarbons and acid gases. The feed gas flow rate is 7.5 MSm$^3$/day (million standard cubic metres per day).

In this example, the flow rate of glycol supplied via the first lean glycol conduit 28 to the stripping step is regulated to achieve a water content of 30 ppm (molar) in the final hydrocarbon gas.

Table 1A illustrates the MEG stream conditions in the various glycol conduits.

TABLE 1A

| Property | Units | Conduit 30 | Conduit 28 | Conduit 36 | Conduit 62 | Conduit 42 | Conduit 48 | Conduit 22 |
|---|---|---|---|---|---|---|---|---|
| MEG purity | wt. % | 90 | 91.8 | 98.3 | 92.5 | 90 | 77.7 | 72.2 |
| Temperature | ° C. | 10.0 | 10.6 | 79.5 | 10.0 | 10.0 | 9.8 | 9.9 |
| Pressure | bar(a) | 200 | 150 | 76 | 150 | 200 | 74.5 | 35.5 |
| Dynamic Viscosity | cP | 24.7 | 24.5 | 3.0 | 25.7 | 24.7 | 14.2 | 11.4 |
| Total Mass flow | kg/h | 283.7 | 438.1 | 286.7 | 304.3 | 150.0 | 328.4 | 352.9 |
| MEG mass flow | kg/h | 255.4 | 402.0 | 281.9 | 281.5 | 135.0 | 255.1 | 254.7 |
| $H_2O$ mass flow | kg/h | 28.4 | 35.8 | 4.5 | 22.4 | 15.0 | 731 | 98.1 |

Table 1B illustrates the conditions at points A to F in the various gas phase conduits.

TABLE 1B

| Property | Units | A | B | C | D | E | F |
|---|---|---|---|---|---|---|---|
| Temperature | ° C. | 10.0 | 9.9 | 80.0 | 79.5 | 9.8 | 10.0 |
| Pressure | bar(a) | 36 | 35.5 | 76 | 76 | 74.5 | 150 |
| $H_2O$ content (mole fraction) | ppm | 323 | 218 | 218 | 350 | 105 | 30 |
| MEG content (mole fraction) | ppm | 0 | 0.5 | 0.5 | 147 | 0.5 | 0.9 |

It is noted that, when mixed with the hydrocarbon gas, a portion of the MEG evaporates and is transported in gas phase. Thus, some of the MEG is present in the gas at the output of each separator 18, 32, 44, 58. Whilst MEG has a higher boiling point than water, and so the level of gas-phase MEG is relatively low, the high temperature at points C and D (before and after the third separator 32) means that the quality of gas-phase MEG passing through the third separator 32 is higher. As a consequence of MEG-evaporation at points C and D, some of the MEG that comes out of the fourth separator 44 is MEG that was injected into the gas stream by the second mixer 26. Similarly, a small proportion of MEG will be present in the output gas at point F.

The following data relate to a second specific example illustrating the steady state operational conditions of the facility 2 when using TEG as the glycol. The process gas received by the facility 2 in this example is again a water-saturated, lean gas, comprising low levels of $C_{2+}$ hydrocarbons and acid gas, supplied at a flow rate of 7.5 MSm³/day. In this example, as above, the flow rate of glycol supplied via the first lean glycol conduit 28 to the stripping step is regulated to achieve a water content of 30 ppm (molar) in the final hydrocarbon gas.

Table 2A illustrates the TEG stream conditions in the various glycol conduits.

TABLE 2A

| Property | Units | Conduit 30 | Conduit 28 | Conduit 36 | Conduit 62 | Conduit 42 | Conduit 48 | Conduit 22 |
|---|---|---|---|---|---|---|---|---|
| TEG purity | wt. % | 94.0 | 94.1 | 98.6 | 94.1 | 94.0 | 67.5 | 65.4 |
| Temperature | ° C. | 10.0 | 10.0 | 79.7 | 10.0 | 10.0 | 9.9 | 9.8 |
| Pressure | bar(a) | 200 | 150 | 76 | 150 | 200 | 74.5 | 35.5 |
| Dynamic Viscosity | cP | 90.0 | 51.9 | 4.7 | 51.6 | 90.0 | 16.6 | 15.7 |
| Total Mass flow | kg/h | 160.4 | 735.8 | 692.6 | 725.4 | 150.0 | 223.5 | 230.5 |
| TEG mass flow | kg/h | 150.8 | 692.5 | 682.84 | 682.7 | 141 | 150.7 | 150.7 |
| $H_2O$ mass flow | kg/h | 9.6 | 38.6 | 7.0 | 38.1 | 9.0 | 71.8 | 79.3 |

Table 2B illustrates the conditions at points A to F in the various gas phase conduits.

TABLE 2B

| Property | Units | A | B | C | D | F | G |
|---|---|---|---|---|---|---|---|
| Temperature | ° C. | 10.0 | 9.8 | 80.0 | 79.7 | 10.0 | 10.0 |
| Pressure | bar(a) | 36 | 35.5 | 76 | 76 | 74.5 | 150 |
| $H_2O$ content (mole fraction) | ppm | 323 | 292 | 292 | 425 | 161 | 30 |
| TEG content (mole fraction) | ppm | 0 | 0 | 0 | 5 | 0 | 0 |

As above, some of the TEG evaporates and will be present in the gas at the output of each separator 18, 32, 44, 58, particularly the third separator 32 where gas is at a high temperature. However, the TEG concentration carried over is much lower than in the MEG example (effectively 0 for most of the separators) because TEG has a much higher boiling point than MEG (285° C. for TEG, compared to 197° C. for MEG).

As will be appreciated, by stripping the glycol to produce ultra-lean glycol, the water content of the hydrocarbon gas at the output from the facility (see water content at location G) can be reduced to a level lower than by dehydration simply using the glycol at the purity received by the facility (see water content at location F).

As discussed above, various glycols can be used for drying of a gas. The preferred glycols are MEG or TEG. However, DEG may also be employed. In various alternative embodiments, other liquid desiccants may also be employed, such as alcohols (e.g. methanol and ethanol) and amine solutions. A mixture of two or more of such liquid desiccants may also be employed.

As will be appreciated, subsea processing facility 2 broadly comprises the following five gas processing stages.

The first stage is an initial separation stage in which a gas phase is separated from a multi-phase hydrocarbon stream. In this embodiment, this stage is provided by the first separator 6.

The second stage is a water-undersaturated gas generation stage in which the gas phase is processed to achieve water-undersaturation. This stage comprises an initial drying stage where the gas phase is dried to an initial water content level, which is achieved in this embodiment by the first mixer 14 for injecting semi-lean glycol (a hydrate inhibitor), the first cooler 16 and the first separator 18, and a heating stage, which is achieved in this embodiment by the compressor 24.

The third stage is a stripping stage in which the water-undersaturated gas is used to strip water from a lean glycol stream. In this embodiment, this stage is provided by the second mixer 30 and the third separator 32.

The fourth stage is an intermediate drying stage in which the gas from the third stage is dried to an intermediate (first) water content level. In this stage, the bulk of the water stripped from the lean glycol is removed from the gas. In this embodiment, this stage is provided by the second cooler 38, the third mixer 40 for injecting lean glycol (a desiccant) and the fourth separator 44.

The fifth stage is a final drying stage in which the gas from the fourth stage is dried to a final (second) water content level, lower than the intermediate water content level, by using the stripped glycol. In this embodiment, this stage is provided by the third cooler 52, the fourth mixer 54 for injecting lean glycol (a desiccant) and the fifth separator 58.

Whilst a specific embodiment of the subsea facility 2 has been described, it will be appreciated that various modification to the facility 2 are possible within the scope of the invention, which is defined by the claims.

For example, the second compressor 50 and/or the third cooler 52 may be provided after the fifth separator 58, external to the facility 2, or even omitted when it is not necessary to increase the pressure of the hydrocarbon gas phase for further processing.

In another example, the initial drying stage may comprise additional separation stages. For example, in one embodiment, the initial drying stage may include a two-stage cooling configuration, such as discussed in WO2013/004375. For example, the first mixer 14 may be preceded by a further cooler, configured to cool non-hydrated-inhibited hydrocarbon gas to a first temperature above its hydrate formation temperature to knock out water, and a separator configured to separate off the condensed water.

In an alternative embodiment, the first mixer 14 may be omitted such that the initial drying stage is performed only by knocking out water using the first cooler 16. Thus, the fourth liquid-phase conduit 48 becomes a rich glycol which is returned from the facility 2.

In another alternative embodiment, either the second cooler 38, or the third mixer 40 and second lean glycol conduit 42, may be omitted. In such an embodiment, the other of these components provides all of the drying in the intermediate drying phase.

Whilst the preferred embodiment uses gas-water heat exchangers as the coolers 16, 38, 52 to cool the gas, any one or more of these coolers 16, 38, 52 may utilise any other suitable cooling arrangement, such as a refrigerated cooler or a choke valve using the Joule Thomson or Joule-Kelvin effect.

In a further embodiment, only a portion of the hydrocarbon gas in the second gas phase conduit 20 may be used to strip the hydrocarbon gas. For example, a bypass portion of the gas phase from the second separator 18 may be directed straight to the third liquid phase conduit, thereby bypassing the stripping stage, i.e. the second mixer 26 and the third separator 32.

In another embodiment, the rich glycol in conduit 22 (or glycol from any other point in the system) may be injected, after use as a desiccant, into the liquid phase hydrocarbon stream 10 so as to act as a hydrate inhibitor.

Insofar as they are compatible, any or all of the above modifications to the facility 2 may be combined with one another.

Figure 4:
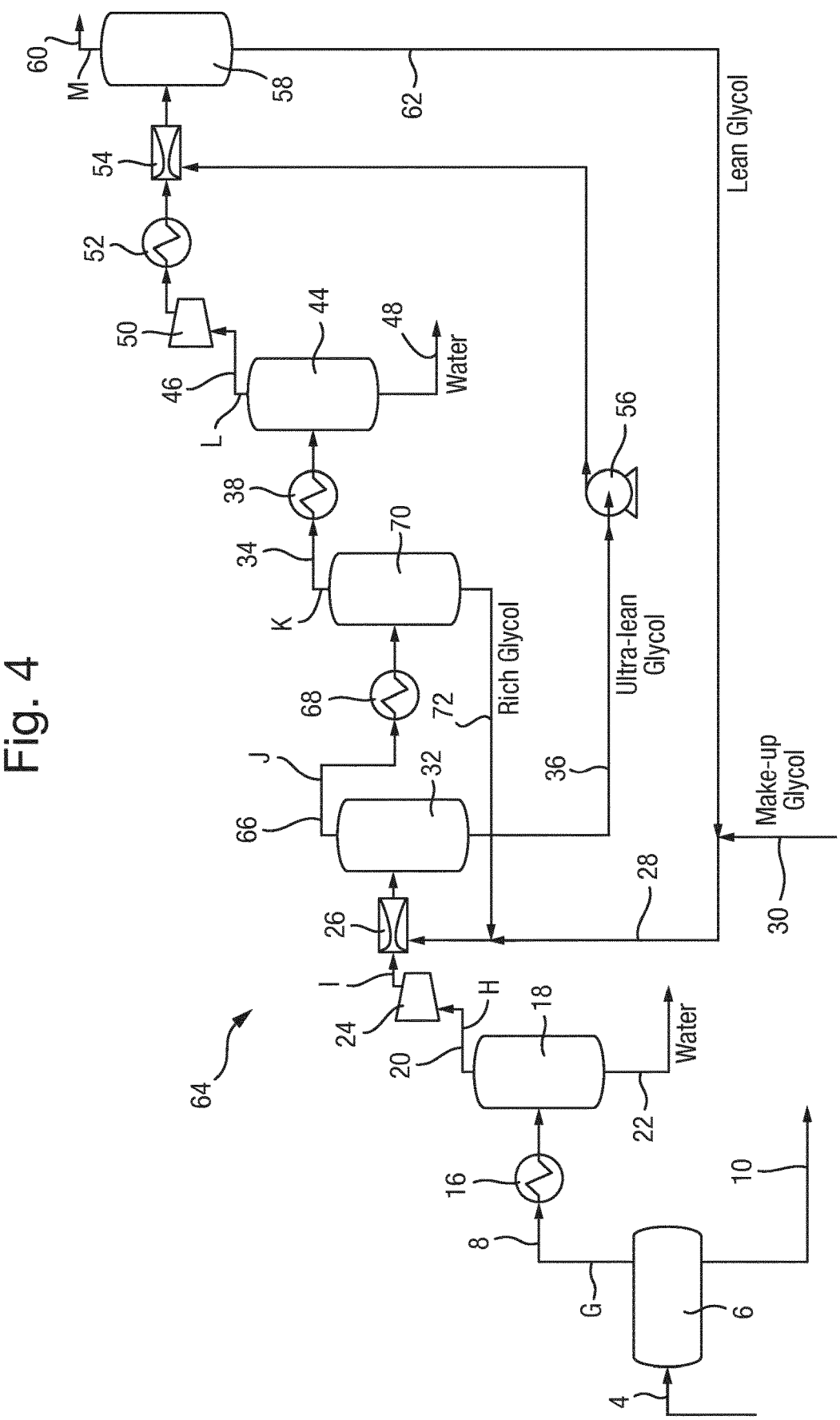
FIG. 4 illustrates a subsea hydrocarbon processing facility according to a second embodiment.

FIG. 4 schematically illustrates another subsea processing facility 64 for processing a multiphase hydrocarbon flow from a wellhead. The second facility 64 shown in FIG. 4 is similar in construction to the first facility 2 shown in FIG. 3.

Component present in both facilities 2, 64 are designated by corresponding reference numerals and detailed description of these components will not be repeated. Only the differences between the first and second facilities 2, 64 will be discussed.

In this embodiment, the initial drying stage and the first drying stage do not make use of the liquid desiccant. That is to say, the semi-lean glycol conduit 12, the first mixer 14, the second lean glycol conduit 42, the third mixer 40 are not present in the second facility 64. Thus, in addition to the second liquid-phase conduit 22, the fourth liquid-phase conduit 48 is also an output from the facility 64 in this embodiment (as opposed to feeding into the semi-lean glycol conduit 12 as in the first facility 2).

As will be appreciated, the liquid-phase output from the second and fourth liquid-phase conduits 22, 48 in this embodiment comprise essentially water. Thus, these outputs may be combined and re-injected into the well via a reinjection well, or sent for water processing elsewhere.

A small quantity of glycol may be present in the liquid-phase contained in the fourth separator 4. As discussed above, this is glycol that has evaporated due to the temperature in the stripping stage and then been condensed again by the second cooler 38. When using TEG, the quantity of gaseous glycol passing through the third separator 32 is very low (see point C in Table 2B). However, for MEG, the quantity is much higher and may result in unacceptable glycol losses when processing the hydrocarbon gas to low water content levels (see point C in Table 1B).

In order to minimise glycol losses from the system (i.e. the quantity of glycol contained in the fourth liquid-phase conduit 48), the stripping stage in the second facility 64 further comprises a gaseous glycol recover portion for capturing gaseous glycol. It is noted that, a similar glycol recover stage could also be implemented in the stripping stage of the first facility 2.

The glycol recovery portion comprises a glycol recover cooler 68 and a glycol recover separator 70. In this embodiment, the gas phase exiting the third separator 32 exits via a glycol recover conduit 66. This gas phase comprises the hydrocarbon gas, gaseous water (including the water present in the undersaturated gas and the water stripped from the glycol) and gaseous glycol. As discussed above, glycol has a relatively high boiling point compared to water. Therefore, by cooling the gas phase to an intermediate temperature (e.g. between 40 and 80° C.) a large proportion of the glycol can be condensed without significant water being knocked out, i.e. the water is not brought (significantly) below its saturation temperature. The intermediate temperature is between a stripping temperature at which the stripping takes place (between 60 and 130° C.) and a water knock-out temperature at which the water is knocked out (typically 10 to 30° C. where a hydrate inhibitor is not present) in the first drying stage.

The cooled mixture is then separated by the glycol recover separator 70. A gas phase (containing low levels of glycol) exits the separator 70 via the third gas-phase conduit 34 and a liquid phase (containing the condensed glycol and any water that has been knocked out) exiting the separator 32 via a recovered glycol conduit 72.

The recovered glycol may very rich compared to the glycol in the fifth liquid-phase conduit 62. However, if a suitable temperature is chosen for the glycol recovery cooler 68, then sufficiently little water should be returned such that it does not prevent the gas stripping removing water to the required water content level.

Thus, as can be seen from the discussion above, the second facility 64 has adapted so as to be essentially self-contained, i.e. the glycol is used and regenerated locally. Thus, in this embodiment, the lean glycol supply conduit 30 needs only to supply a small quantity of make-up glycol to account for glycol lost from the facility 64, i.e. in the fourth liquid-phase conduit 48.

The following data relate to a third specific example illustrating the steady state operational conditions of the second facility 64 when using MEG as the glycol. The process gas received by the facility 2 in this example is again a water-saturated, lean gas, comprising low levels of $C_{2+}$ hydrocarbons and acid gas. The feed gas flow rate is again 7.5 MSm$^3$/day. In this example, as above, the flow rate of glycol supplied to the solvent feed to the stripping step is regulated to achieve a water content of below 30 ppm (molar) in the final hydrocarbon gas. It is noted that higher glycol flow rates are required in this example compared to the first example because the difference between ultra-lean and lean MEG composition is smaller.

Table 3A illustrates the MEG stream conditions in the various glycol conduits.

TABLE 3A

| Property | Units | Conduit 36 | Conduit 62 | Conduit 72 | Conduits 48 |
|---|---|---|---|---|---|
| MEG purity | wt. % | 94.1 | 93.0 | 66.9 | 4.2 |
| Temperature | ° C. | 101.9 | 10.0 | 59.9 | 29.8 |
| Pressure | bar(a) | 76.0 | 150.0 | 74.5 | 73.0 |
| Total Mass flow | kg/h | 14823 | 14987 | 491 | 326 |
| MEG mass flow | kg/h | 13947 | 13946 | 329 | 13.7 |
| H$_2$O mass flow | kg/h | 855 | 1025 | 162 | 312 |

Table 3B illustrates the conditions at points G to N in the various gas phase conduits.

TABLE 3B

| Property | Units | G | H | I | J | K | L | M |
|---|---|---|---|---|---|---|---|---|
| Temperature | ° C. | 30 | 29.8 | 110 | 101.9 | 60 | 29.8 | 10 |
| Pressure | bar(a) | 36 | 35.5 | 76 | 76 | 74.5 | 73 | 150 |
| H$_2$O content (mole fraction) | ppm | 1344 | 1344 | 1344 | 2728 | 2050 | 742 | 28 |
| MEG content (mass flow) | kg/h | — | 0 | 0 | 342 | 13.7 | 0.05 | 0.76 |

As will be appreciated from Tables 3A, the glycol recovery stage significantly reduces the MEG quantity in conduit 48 compared to if it was not present (the liquid phase in conduit 72 would otherwise also be present in conduit 48). In this example, the MEG loss from the system is 14.5 kg/h, which must be restored by make-up MEG supplied from conduit 30.

The following data relate to a fourth specific example illustrating the steady state operational conditions of the second facility 64 when using TEG as the glycol. The process gas received by the facility 64 in this example is also a water-saturated, lean gas, comprising low levels of $C_{2+}$ hydrocarbons and acid gas, supplied at a flow rate of 7.5 MSm$^3$/day. In this example, as above, the flow rate of glycol supplied to the solvent feed to the stripping step is regulated to achieve a water content of below 30 ppm (molar) in the final hydrocarbon gas.

Table 4A illustrates the TEG stream conditions in the various glycol conduits.

TABLE 4A

| Property | Units | Conduit 36 | Conduit 62 | Conduit 72 | Conduits 48 |
|---|---|---|---|---|---|
| TEG purity | wt. % | 95.2 | 94.2 | 6.6 | — |
| Temperature | ° C. | 100.0 | 10.0 | 49.9 | 29.8 |
| Pressure | bar(a) | 76.0 | 150.0 | 74.5 | 73.0 |
| Total Mass flow | kg/h | 20496 | 20707 | 402 | 311 |
| TEG mass flow | kg/h | 19505 | 19505 | 27 | 0 |
| H$_2$O mass flow | kg/h | 898 | 1070 | 375 | 310 |

Table 3B illustrates the conditions at points G to N in the various gas phase conduits.

TABLE 4B

| Property | Units | G | H | I | J | K | L | M |
|---|---|---|---|---|---|---|---|---|
| Temperature | ° C. | 30.0 | 29.8 | 110.0 | 100.0 | 50 | 29.8 | 10.0 |
| Pressure | bar(a) | 36.0 | 35.5 | 76.0 | 76.0 | 74.5 | 73.0 | 150.0 |
| H$_2$O content (mole fraction) | ppm | 1344 | 1344 | ?? | 3621 | 2053 | 751 | 30 |
| TEG content (mass flow) | kg/h | 0 | 0 | 0 | 26.5 | 0.009 | 0 | 0 |

For the TEG example, glycol losses are extremely low and well within the acceptable limits. Indeed, in one example, the make-up TEG could be supplied from a local, subsea make-up store that is periodically replenished, rather than having a permanent supply from a topside facility.

The boiling point of MEG is lower, and so it is harder to reduce the loss of MEG. The MEG example has losses of about 14.5 kg/hr. Glycol losses are often compared to the gas flow rate, and the loss in this example equates to about 46 kg of MEG lost per MSm$^3$ of gas. This loss rate is relatively high, but may be acceptable for certain applications.

Whilst specific embodiments of the subsea facility 2, 64 have been described, it will be appreciated that various modification to the facilities 2, 64 are possible within the scope of the invention, which is defined by the claims. Insofar as they are compatible, any or all of the above optional modifications to the first facility 2 may be applied to the second facility 64.

It should be apparent that the foregoing relates only to the preferred embodiments of the present application and the resultant patent. Numerous changes and modification may be made herein by one of ordinary skill in the art without departing from the general spirit and scope of the invention as defined by the following claims and the equivalents thereof.

We claim:

1. A method of dehydrating a hydrocarbon gas stream, comprising:
   receiving a liquid desiccant;
   locally stripping at least a portion of the liquid desiccant of water using a water-undersaturated portion of the gas stream to provide a gas stream containing stripped water, and a stripped desiccant stream, the water-undersaturated portion of the gas stream having an initial water content level;

a first drying step in which the gas stream containing stripped water is dried to a first water content level to provide a partially-dried gas stream; and a second drying step in which the partially-dried gas stream is dried, using the stripped desiccant stream, to a second water content level to provide a highly-dried gas stream, the second water content level being lower than both the initial water content level and the first water content level.

2. A method according to claim 1, further comprising:
after the second drying step, and optionally after use in one or more other local processing steps, returning the liquid desiccant to a desiccant regeneration facility at a remote location for regeneration.

3. A method according to claim 1, further comprising:
an initial drying step in which at least a portion of the gas stream is dried to provide a pre-dried gas steam having an initial water content level; and
an undersaturation step in which at least a portion of the pre-dried gas stream is heated to generate the water-undersaturated portion of the gas stream.

4. A method according to claim 3, wherein the initial drying step comprises:
cooling the gas stream in the presence of a liquid desiccant; and
separating the mixture into the pre-dried gas stream, and a water-containing stream including the liquid desiccant.

5. A method according to claim 4, further comprising:
sending the liquid desiccant in the water-containing stream for regeneration in a regeneration facility at the remote location.

6. A method according to claim 1, wherein the first drying step comprises:
cooling the gas stream containing the stripped water;
mixing the gas stream containing stripped water with liquid desiccant; and
separating the mixture into the partially-dried gas stream, and a water-containing stream including the liquid desiccant.

7. A method according to claim 4, wherein the first drying step comprises:
cooling the gas stream containing the stripped water;
mixing the gas stream containing stripped water with liquid desiccant; and
separating the mixture into the partially-dried gas stream and a water-containing stream including the liquid desiccant,
wherein the liquid desiccant in the water-containing stream from the first drying step is used to provide the liquid desiccant in the initial drying step.

8. A method according to claim 6, wherein the liquid desiccant in the stripping step comprises a first portion of a liquid desiccant stream from a desiccant regeneration facility at the remote location, and wherein the liquid desiccant in the first drying step comprises a second portion of the liquid desiccant stream from the desiccant regeneration facility.

9. A method according to claim 1, wherein the water-undersaturated portion of the gas stream comprises a first portion of the gas stream, and wherein a second portion of the gas stream that has not been used to strip the liquid desiccant is mixed with the gas stream containing stripped water or with the partially-dried gas stream.

10. A method according to claim 1,
wherein the stripping step comprises co-currently mixing the liquid desiccant with the undersaturated portion of the gas stream and separating the mixture into the gas stream containing stripped water and the stripped desiccant stream; and/or
wherein the second drying step comprises co-currently mixing the stripped desiccant with the partially-dried gas stream and separating the mixture into the highly-dried gas stream and a desiccant stream.

11. A method according to claim 1, wherein the liquid desiccant comprises monoethylene glycol (MEG) or triethylene glycol (TEG).

12. A method according to claim 1, wherein the method is performed subsea.

13. A hydrocarbon gas dehydration facility, comprising:
a stripping stage configured to receive a desiccant stream and a water-undersaturated hydrocarbon gas stream, wherein the stripping stage is configured to strip water from the desiccant using the hydrocarbon gas stream, and to output a gas stream containing the stripped water and a stripped desiccant stream;
a first drying stage configured to receive the gas stream containing the stripped water, the first drying stage being configured to dry the gas stream containing the stripped water to a first water content level, which is output as a partially-dried gas stream; and
a second drying stage configured to receive the partially-dried natural gas stream and the stripped desiccant stream, the second drying stage being configured to dry, using the stripped desiccant stream, the partially-dried gas stream to second water content level, which is output as a dried gas stream, the second water content level being lower than the first water content level.

14. A facility according to claim 13, further comprising:
an initial drying stage configured to receive the hydrocarbon gas stream and to dry the hydrocarbon gas stream to an initial water content level, which is output as a pre-dried hydrocarbon gas stream; and
an undersaturation stage configured to receive at least a portion of the hydrocarbon gas stream and to heat the hydrocarbon gas stream to generate the water-undersaturated portion of the gas stream for supply to the stripping stage.

15. A facility according to claim 13, wherein the first drying stage comprises a mixer for mixing the gas stream containing the stripped water with a liquid desiccant, and a separator for outputting the partially-dried gas stream and a water-containing stream contains the liquid desiccant.

16. A facility according to claim 14, wherein the first drying stage comprises a mixer for mixing the gas stream containing the stripped water with a liquid desiccant, and a separator for outputting the partially-dried gas stream and a water-containing stream contains the liquid desiccant, and wherein the initial drying stage comprises a cooler, for cooling the gas stream, and a separator, wherein the water-containing stream from the first drying stage is mixed with the gas stream upstream of the cooler.

17. A facility according to claim 13, further comprising:
a regulating device for controlling flow of stripped desiccant from the stripping stage to the second drying stage, wherein the facility is configured such that excess stripped desiccant is recycled to another location within the facility.

18. A facility according to claim 13, wherein the facility is a subsea, hydrocarbon gas dehydration facility.

19. A method according to claim 1, wherein the first drying step comprises cooling the gas stream containing the stripped water and separating a water-containing stream from the cooled gas stream to provide the partially-dried gas stream.

20. A method according to claim 13, wherein the initial drying stage is configured to cool the gas stream and separate a water-containing stream from the cooled gas stream to output the partially-dried gas stream.

\* \* \* \* \*